US005546247A

United States Patent [19]
Fujioka et al.

[11] Patent Number: 5,546,247
[45] Date of Patent: Aug. 13, 1996

[54] TRACKING CONTROL APPARATUS

[75] Inventors: Souichirou Fujioka, Sakai; Masafumi Nishida, Ibaraki; Michifumi Inai, Hirakata, all of Japan

[73] Assignee: Matsushita Electric Industrial Co. Ltd., Osaka, Japan

[21] Appl. No.: 186,623

[22] Filed: Jan. 26, 1994

[30] Foreign Application Priority Data

Jan. 27, 1993 [JP] Japan .................................. 5-011399
Jun. 28, 1993 [JP] Japan .................................. 5-156673
Oct. 15, 1993 [JP] Japan .................................. 5-258169

[51] Int. Cl.$^6$ .................................................. G11B 5/584
[52] U.S. Cl. .................................... 360/77.13; 360/77.14
[58] Field of Search ........................... 360/73.12, 73.11, 360/70, 71, 27, 77.13, 77.14

[56] References Cited

U.S. PATENT DOCUMENTS 4,104,684  8/1978  Wakami et al. .................... 360/77.11

FOREIGN PATENT DOCUMENTS 63-104255  5/1988  Japan .
2-276051  11/1990  Japan .

*Primary Examiner*—Aristotelis Psitos
*Assistant Examiner*—James T. Wilson
*Attorney, Agent, or Firm*—Wenderoth, Lind & Ponack

[57]  ABSTRACT

In a magnetic reproduction system in which a magnetic tape must be controlled to run so as to keep a specified relative phase to a rotary phase of a rotary head, a tracking control apparatus obtains a characteristic curve showing a characteristic relationship between the relative phase and an envelope level of a reproduced information signal obtained by the rotary head by changing the relative phase, obtains a regression curve with respect to the characteristic curve, and controls the magnetic tape to run so that the relative phase becomes a value corresponding to a maximum value point of the regression curve.

10 Claims, 13 Drawing Sheets

TRACKING CONTROL APPARATUS

BACKGROUND OF THE INVENTION

1. Field of the Invention

This invention relates to magnetic reproduction equipment including a video tape recorder (hereinafter referred to as a VCR) and particularly to a tracking control apparatus which automatically regulates relative-positional errors of a reproduction head and a track.

2. Description of the Prior Art

Image signals have so far been recorded in such a known VHS-system VCR records a video signal on a magnetic tape by running the magnetic tape at a constant speed to form helical tracks on it with a rotary head rotating synchronously with the vertical synchronizing signal contained in the video signal and, at the same time, records a control signal on the magnetic tape in a lengthwise direction with a control head installed at a specific distance from the rotary head. Then, at the time of video signal reproduction, the rotary head is rotated at a phase synchronized with a phase of a reference signal having the same frequency as that of the vertical synchronizing signal and the magnetic tape is run at the same speed as that at the time of recording. At that time, the positional coincidence between a helical track and the rotary head is achieved by making the phase of the control signal reproduced by the control head with respect to the phase of the reference signal (hereinafter referred to as the tracking phase) equivalent with the relationship between the phases of the vertical synchronizing signal and the control signal at the time of recording.

However, when the magnetic tape on which the video signal has already been recorded elongates or shrinks due to, for example, an increase in ambient temperature or there is any difference in mechanical accuracy of the tape running system between the VCR used for recording and the VTR used for reproducing the signal, the distance between the positions of the control signal and the helical track recorded on the magnetic tape no longer becomes the same as the distance between the positions of the rotary and control heads. This causes an error in the relative position of the rotary head to the helical track, which in turn causes a failure in reproduction of good-quality video signal. Such a tracking control device is known that is capable of automatically and gradually changing the tracking phase at, for example, the initial stage of signal reproduction to find out a point where the envelope level of the signal reproduced by the rotary head becomes maximum, and adjusting the tracking phase into this point, as disclosed in Japanese Patent Publication No. 63-104255 (1988).

However, due to the general occurrence of a change in the state of contact between the rotary head and the magnetic tape, the envelope level of the reproduced signal obtained at the rotary head fluctuates even if the tracking phase is constant. As a measure to remove such an effect from the conventional tracking control device, envelope level of the signal reproduced at a given tracking phase is sampled several times and averaged.

For further improvement of tracking accuracy, it is necessary to increase the number of the tracking phase changing steps. This, however, causes an increase of the time required to complete a series of tracking operation, because plural samplings, as mentioned above, of the reproduction envelope level are required in each step, or for each tracking phase.

Moreover, when the track width of the helical track differs from the head width of the rotary head, it is difficult for the conventional device to adjust tracking by simply determining the optimum point of tracking phase, because the reproduction envelope level response to the tracking phase takes the shape of upward convex trapezoid without having an exact peak.

Another conventional tracking control method has been disclosed in Japanese Patent Publication No. 2-276051 (1990). In this tracking control method, the phase relationship between the control signal recorded on the control track of a magnetic tape and rotation of the rotary drum provided with a rotary head (tracking phase) is gradually changed to detect a change of the signal level of the reproduced signal to obtain a curve showing the characteristic of the level of the reproduced signal changing with the change of the tracking phase. Then the barycenter of the characteristic curve is determined to control a capstan motor in accordance with the phase relationship in the barycenter obtained. In this method, however, tracking can not be controlled accurately when an accurate reproduced signal level change characteristic curve is not obtained due to noise and/or reproduced signal fluctuations. To reduce the effects due to noise and/or reproduced signals, it is necessary to repeat the measurement several times and obtain an averaged result, which requires more time to spend for tracking operation.

SUMMARY OF THE INVENTION

An object of this invention is to provide a tracking control apparatus which requires shorter time to spend for accurate tracking operation than the conventional tracking control systems and can perform accurate tracking operation even if the track width of the helical track differs from the head width of the rotary head used for reproduction.

A tracking control apparatus of this invention may be applied to a magnetic reproduction system in which a distance between positions of a helical track recorded on a magnetic tape and a control signal recorded on the magnetic tape in a lengthwise direction thereof synchronously with a reference signal is predetermined and, at the time of reproduction, a relative position of the helical track to a rotary head is adjusted by controlling a tracking phase, namely, a phase of a reproduced control signal with respect to the reference signal to regulate tracking. To achieve the above object, a tracking control apparatus of this invention is provided with a curve generator for obtaining a characteristic curve representing a relationship between the tracking phase and an envelope level of a reproduced signal obtained by the rotary head by changing the tracking phase, a non-linear regression calculator for obtaining a regression curve with respect to the characteristics curve, and a controller for phase-controlling a running of the magnetic tape such that the tracking phase has a value corresponding to a maximum point of the regression curve.

A tracking control device of this invention allows the reproduction envelope level sampled in correspondence with each tracking phase to be averaged equivalently even if fluctuating components are contained in the reproduced signal, because the characteristic curve of the tracking phase and reproduction envelope level is subjected to the non-linear regression. It is, therefore, not necessary to repeat the sampling of reproduced signal several times for each given tracking phase. Furthermore, the contents of any interval from one sampling of tracking phase to another are interpolated by a continuous function due to the non-linear regression of the characteristics curve of the tracking phase and reproduction envelope level. This eliminates the conventionally required means for increasing the number of tracking phase changing steps in obtaining a characteristic curve of the tracking phase and reproduction envelope level.

Preferably, a quadratic polynomial function may be used to obtain a regression curve. The regression curve-purpose use of a quadratic polynomial function enables a maximum value to be calculated only by four fundamental rules of arithmetics of polynomial coefficients, thereby simplifying the system configuration. In addition, although a quadratic polynomial function has only one inflection point, this inflection point (namely, the maximum point) coincides with the point where the reproduction envelope level is the maximum. Moreover, even if the helical track width is not identical to the width of the rotary head with which the reproduced signal is obtained, the center of a trapezoidal characteristic curve is coincident with the maximum point of the regression curve.

The above constitutes the reasons why this invention is able to provide a tracking control apparatus which requires a shorter time to spend for accurate tracking operation than the conventional systems and can be applied to the case where the track width of the helical track differs from the head width of the rotary head used for reproduction.

More preferably, for realizing a much higher accuracy in tracking regulation, such an operation may be repeated that obtains another characteristic curve showing a relationship between the tracking phase and the envelope level of the reproduced signal obtained by the rotary head in a symmetrical tracking phase range with respect to the tracking phase corresponding to the maximum point of the regression curve and then calculates another regression curve with respect to the another characteristic curve.

DESCRIPTION OF THE PREFERRED EMBODIMENTS

Figure 1:
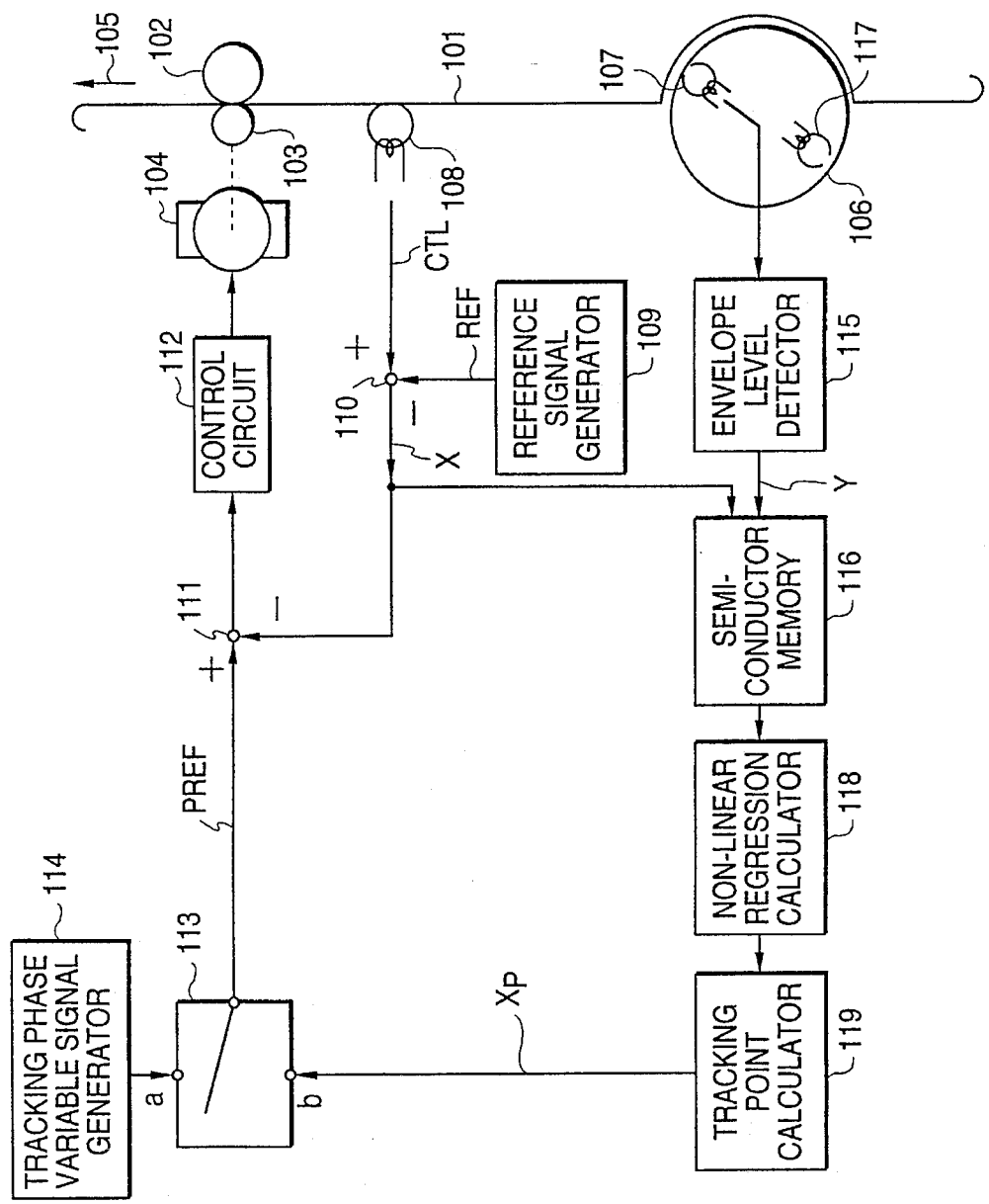
FIG. 1 is a block diagram of a tracking control apparatus in accordance with an embodiment of this invention.

Preferred embodiments of this invention are described below with reference to the drawings. FIG. 1 is a schematic block diagram of a tracking control apparatus in accordance with an embodiment of this invention.

A magnetic tape 101 is driven to run in the arrow direction 105 by a pinch roller 102, a capstan shaft 103, and a capstan motor 104 directly connected to the capstan shaft 103. The magnetic tape 106 is wound on a rotary drum 106 over an appropriate angle (180°). To the rotary drum 106 are attached rotary heads 107 and 117 rotating to scan a video signal recorded helical track formed on the magnetic tape 101 and obtain a reproduced video signal. The rotary heads 107 and 117 have azimuth angles different from each other and about the same head width Hw. A control head 108 reproduces a control signal recorded on the magnetic tape 101 in a longitudinal direction of the tape to obtain a reproduced control signal CTL.

Figure 2:
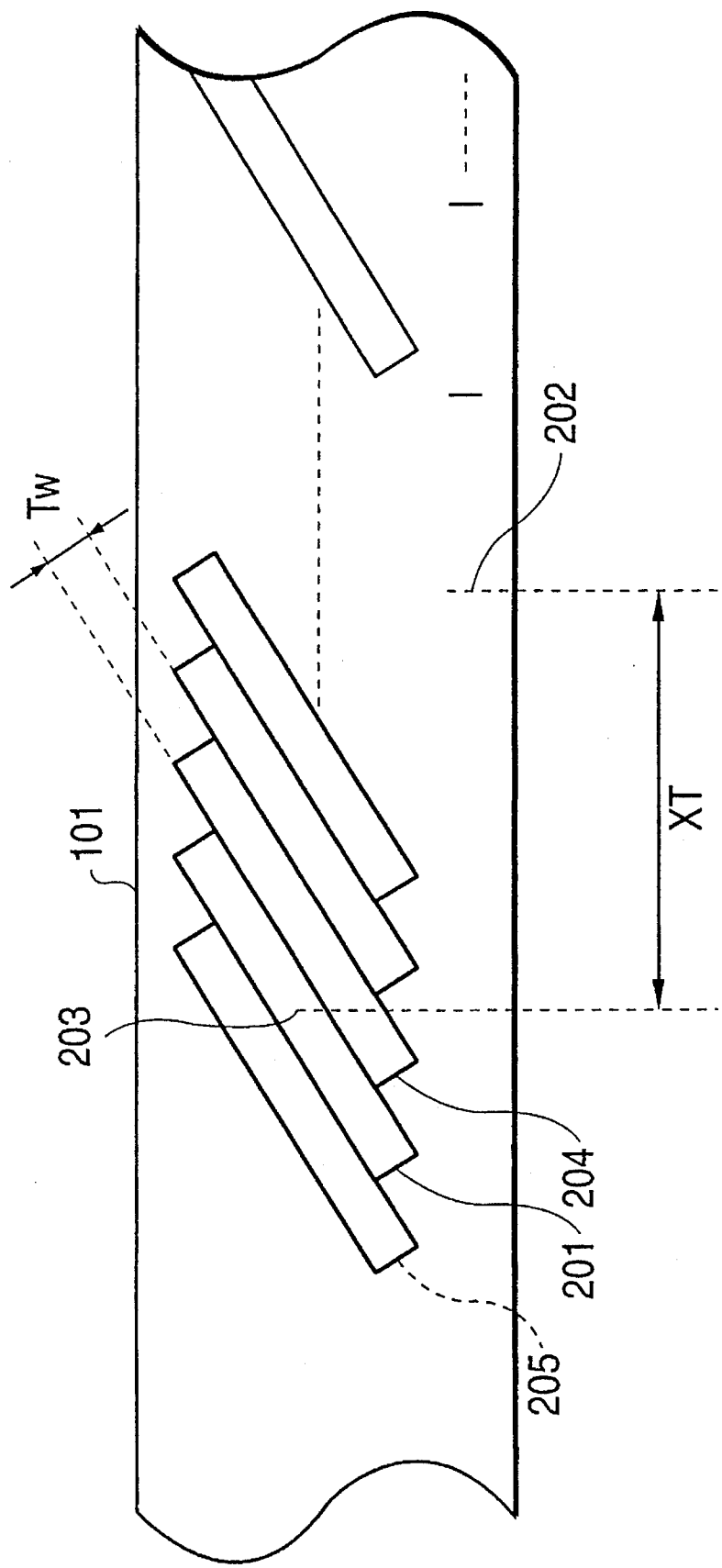
FIG. 2 shows a signal recording pattern of a magnetic tape 101.

FIG. 2 shows a signal recording pattern of the magnetic tape 101. For recording on the tape, the same pattern is repeated at every two different-azimuth angle helical tracks (namely, each time the rotary drum 106 rotates 360°). The helical track 201 has the same azimuth angle as the rotary head 107 and the helical tracks 204 and 205 have the same azimuth angle as the rotary head 117. The track width Tw of each of the helical tracks 201, 204 and 205 is about equal to the head width Hw of each of the rotary heads 107 and 117. The recording position of the control signal is determined at a distance of XT from the center 203 of the helical track 201.

Figure 10:
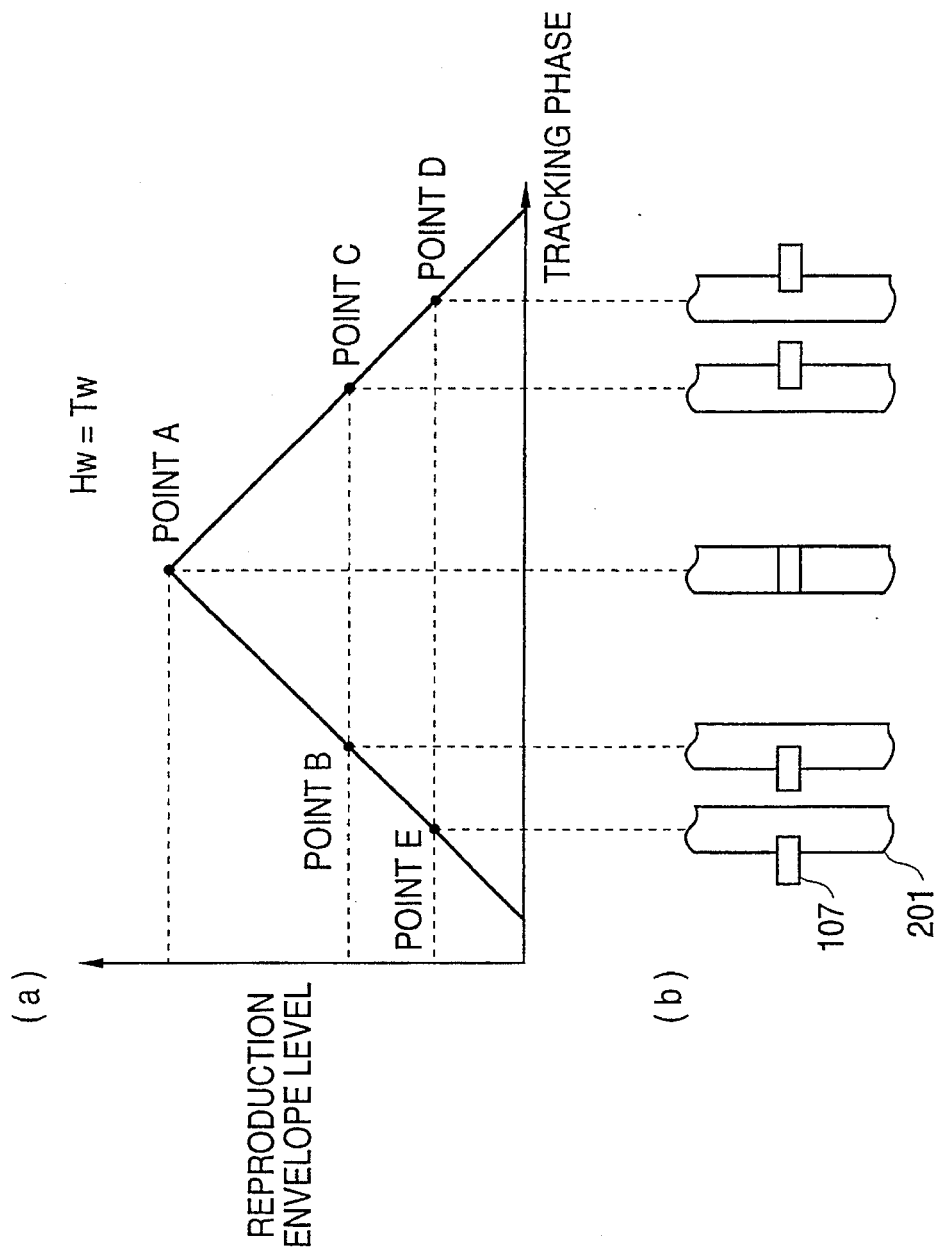
FIG. 10(a) or (b) shows a characteristic relationship between a tracking phase and a reproduced signal envelope level at a rotary head when a track width of a helical track is about the same as a head width of the rotary head by which the reproduced signal is obtained and a relative-positional relationship between the helical track and the rotary head at each point illustrated.

In FIG. 10, (a) shows a characteristic relationship between the tracking phase and the reproduced video signal envelope level at the rotary head when, as in this embodiment, the track width of the helical track is about the same as the head width of the rotary head at which the reproduced video signal is obtained. In FIG. 10, (b) shows a relative-positional relationship between the helical track and the rotary head at each point of A, B, C, D and E. The positions of the rotary head 107 and the helical track 201 coincide with each other at the point A where the reproduction envelope level becomes the maximum.

Referring to FIG. 1, a reference signal REF generated by a reference signal generator 109 gives a reference phase to be used in detecting and controlling the phase of the reproduced control signal CTL. A phase comparator 110 receives the reference signal REF and the reproduced control signal CTL and detects a tracking phase X (the phase of the reproduced control signal CTL with respect to the reference signal REF). A phase error detector 111 receives a tracking phase command signal PREF which indicates a target value of the tracking phase X and the tracking phase signal X and outputs an error therebetween. A control circuit 112 supplies electric power in an amount proportional to the error, i.e., an output signal of the phase error detector 111, to the capstan motor 104. This allows the running of the magnetic tape 101 to be controlled so that the phase of the reproduced control signal CTL with respect to the reference signal REF (the tracking phase X) is given as the tracking phase command signal PREF.

In the tracking operation performed by the tracking control apparatus in this embodiment, first of all, a switch 113 selects an output of a tracking phase variable signal generator 114 as the tracking phase command signal PREF. The tracking phase variable signal generator 114 generates a ramp signal. This allows the phase of the reproduced control signal CTL with respect to the reference signal REF (tracking phase X) to be changed in correspondence with the ramp signal outputted from the tracking phase variable signal generator 114.

On the other hand, the reproduced video signal at the rotary head 107 is applied to an envelope level detector 115. The envelope level detector 115 detects a reproduction envelope level Y (the envelope level of the reproduced video signal obtained at the rotary head). A semiconductor memory 116 sequmentially stores each tracking phase signal X controlled according to the output of the tracking phase variable signal generator 114 and a reproduction envelope level Y corresponding to the tracking phase signal X as a pair of data.

Figure 3:
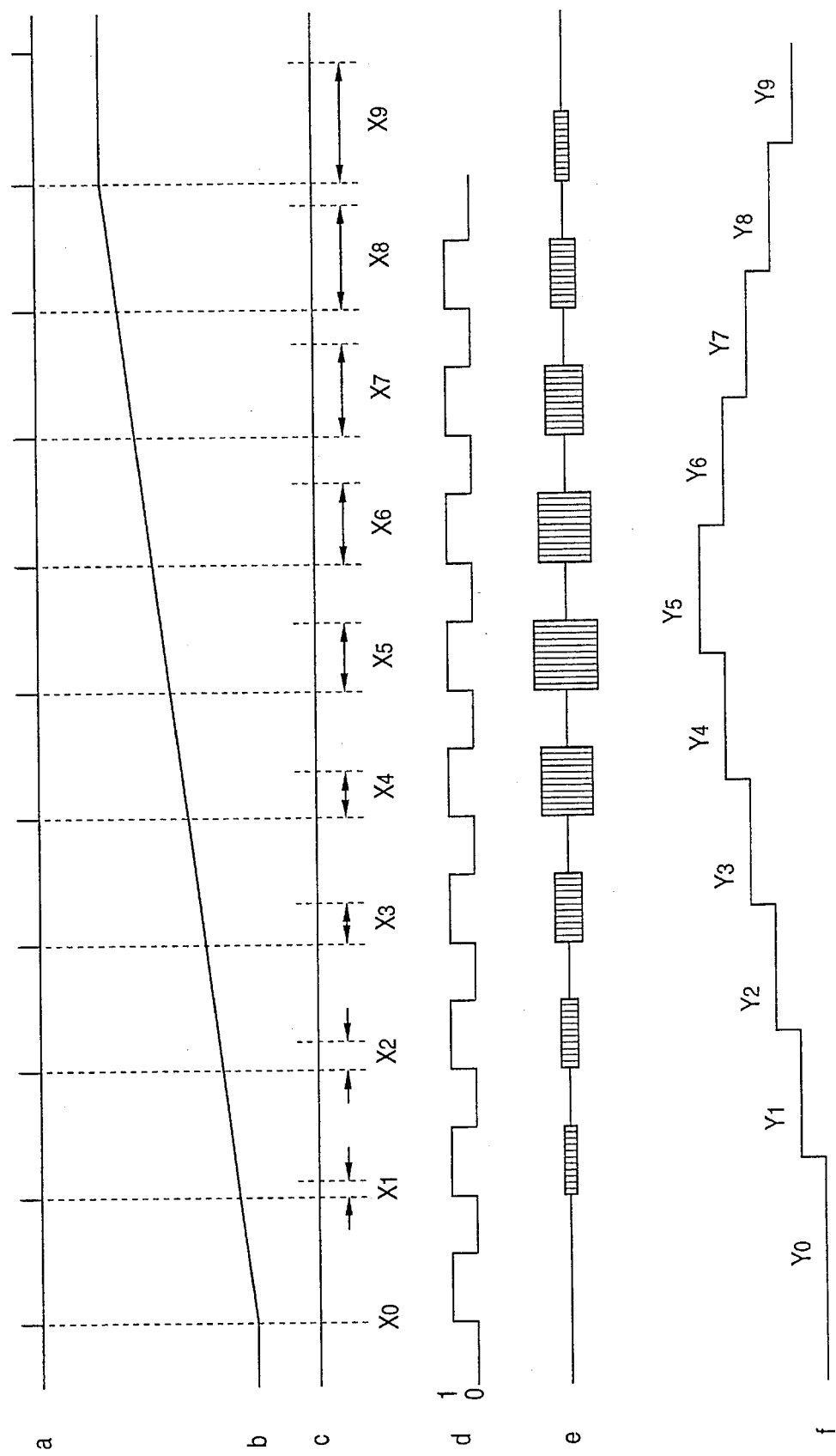
FIGS. 3(a)–(f) shows a waveform diagram at an initial stage of the tracking operation performed by the tracking control apparatus in the embodiment.

FIG. 3 shows a waveform diagram of major portions at an initial stage of the tracking operation performed by the tracking control apparatus in this embodiment. In FIG. 3, the waveform a is a waveform of the reference signal outputted from the reference signal generator 109 and the waveform b is a waveform of the signal outputted from the tracking phase variable signal generator 114 in the form of a ramp signal as mentioned above. The waveform c is a waveform of the reproduced control signal CTL reproduced by the control head 108 and having a phase with respect to the reference signal REF been changed according to the output signal of the tracking phase variable signal generator 114 so that the value of the tracking phase X changes from X0 to X1, ..., X9. The signal d is a signal indicating the rotary phase of the rotary head 107 mounted on the rotary drum 106, and the signal level of "1" indicates a period in which the rotary head 107 is in contact with the magnetic tape 101. The waveform e shows a waveform of the reproduced video signal obtained at the rotary head 107, whose state being in contact with the magnetic tape 101 means that the reproduced video signal is been obtained. The reproduction envelope level changes with the change of the phase of the reproduced control signal CTL with respect to the reference signal REF (tracking phase X). The waveform f is a waveform of the reproduction envelope level Y outputted from the envelope level detector 115. The envelope level detector 115 undergoes a timing control so that the envelope level of the reproduced video signal obtained at the rotary head 107 is detected when the rotary head 107 scans the central part of the helical track. In other words, the envelope level detector 115 samples and outputs an envelope level of the reproduced video signal obtained by the rotary head 107 at the timing of the rotary head 107 scanning the central point 203 (predetermined at a distance of XT from the control signal recording position 202) of the helical track 201 shown in FIG. 2.

The tracking phase (the phase of the reproduced control signal CTL with respect to the reference signal REF) corresponds to a track-widthwise position of the rotary head 107 relative to the helical track on the magnetic tape 101 scanned by the rotary head 107, and the reproduction envelope level (the envelope level of the reproduced video signal obtained at the rotary head 107) changes depending on the change of the tracking phase.

In this way, when the tracking phase variable signal generator 114 outputs a ramp signal at the initial stage of the tracking operation performed by the tracking control apparatus in this embodiment (the switch 113 selects the output of the tracking phase variable signal generator 114), each components are put in operation and $X0, X1, \ldots, Xi$ (here the suffix i means a natural number) are discretely obtained as the data of the tracking phase X, which is the phase of the reproduced control signal CTL with respect to the reference signal REF. And $Y0, Y1, \ldots, Yi$ (here the suffix i also means a natural number) are discretely obtained as the data of the reproduction envelope level Y (indicated by the scale of envelope of the reproduced signal obtained at the rotary head 107) corresponding to each of the tracking phase X data. The number of samples of the respective data may be arbitrarily set by changing the slope of the ramp signal generated by the tracking phase variable signal generator 114. In FIG. 3, the number of data samples is 10, for the explanatory convenience. The actual number of data samples in this embodiment is set 100. These 100 discrete data (Xi and Yi) are, as mentioned above, stored in the semiconductor memory 116.

Figure 4:
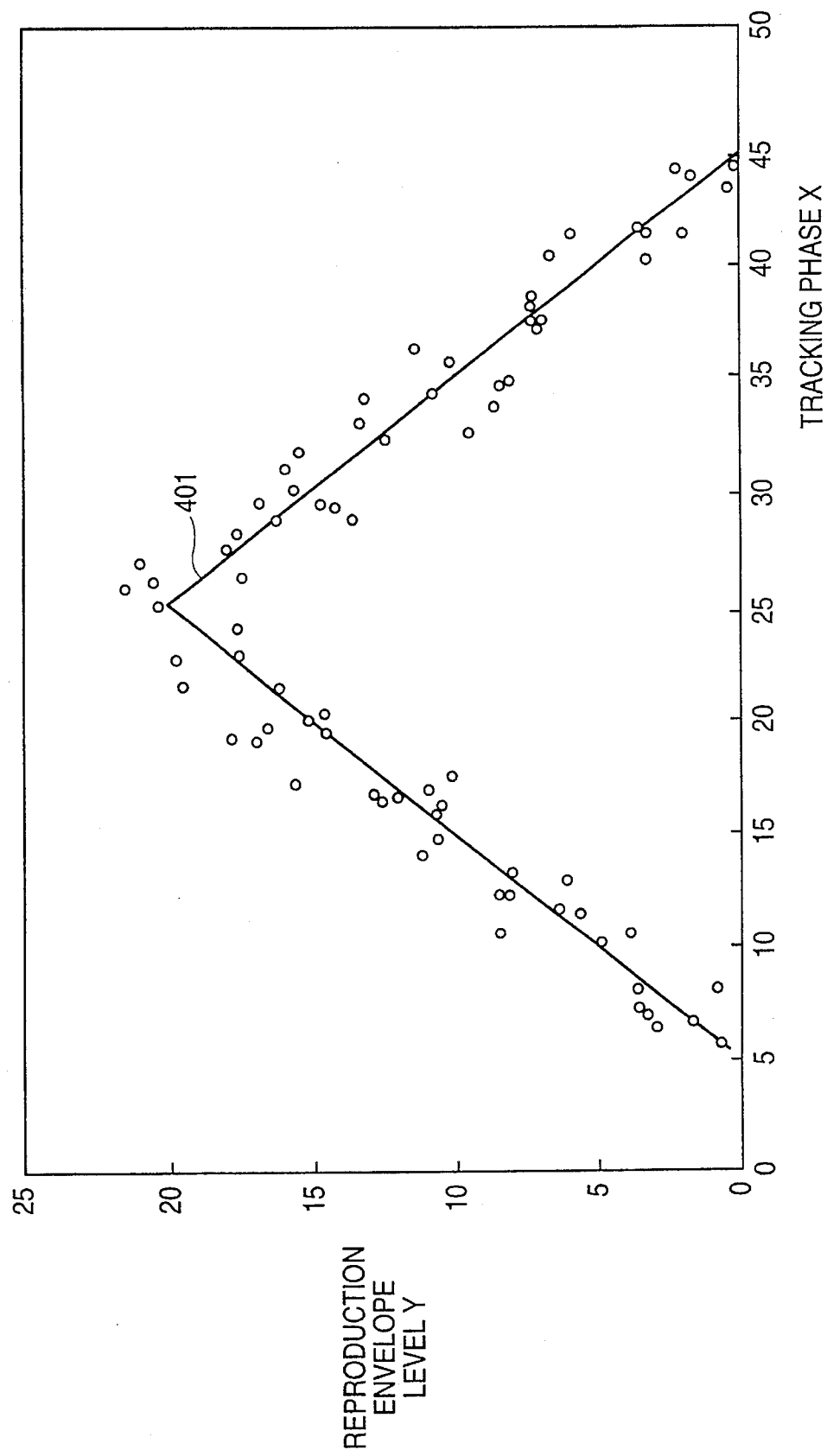
FIG. 4 shows a characteristic relationship between a tracking phase X and a reproduction envelope level Y corresponding to the tracking phase X.

FIG. 4 shows a characteristic relationship between the tracking phase X and the reproduction envelope level Y corresponding to the tracking phase X. In this figure, the curve 401 is a theoretical value curve based on the principle of magnetic recording and circular marks indicate the points at which the discrete data (Xi, Yi) obtained as above are plotted. The obtained discrete data (Xi, Yi) are, in this way, dispersively distributed due to measurement noise and/or the fluctuations in the state of contact between the head and the tape, though they basically follow the theoretical value curve.

A non-linear regression calculator 118 executes a non-linear regression calculation using the 100 discrete data (Xi, Yi) stored in the semiconductor memory 116. In this embodiment, a quadratic polynomial function is used as a regression curve. In other words, on the assumption that the tracking phase X and the reproduction envelope level Y approximately follow an equation (1) below, polynomial coefficients a, b and c are determined so as to best conform to the characteristic of the actually measured data (Xi, Yi).

$$Y = a + b \cdot X + c \cdot X^2 \tag{1}$$

Here, the polynomial expressed by X on the right side of the above equation (1) is, for convenience' sake, defined in terms of a function f(X) as:

$$f(X) \geq a + b \cdot X + c \cdot X^2 \quad (2)$$

Meanwhile, another function G is hereby defined as:

$$G = \sum_{i=0}^{99} [Yi - f(Xi)]^2 \quad (3)$$

The function G defined here is used to determine the square-sum of the differences between the measured data Yi and the corresponding approximate value (the value obtained by the equation (1)). To minimize the differences between the measured data (Xi, Yi) and an approximate curve obtained by the equation (1), a partial differentiation value of each of the function G's polynomial coefficients a, b and c is required to become "0". This results in simultaneous equations (4), (5) and (6) expressed by a, b and c shown below.

$$100 \cdot a + \sum_{i=0}^{99} Xi \cdot b + \sum_{i=0}^{99} Xi^2 \cdot C = \sum_{i=0}^{99} Yi \quad (4)$$

$$\sum_{i=0}^{99} Xi \cdot a + \sum_{i=0}^{99} Xi^2 \cdot b + \sum_{i=0}^{99} Xi^3 \cdot C = \sum_{i=0}^{99} Xi \cdot Yi \quad (5)$$

$$\sum_{i=0}^{99} Xi^2 \cdot a + \sum_{i=0}^{99} Xi^3 \cdot b + \sum_{i=0}^{99} Xi^4 \cdot C = \sum_{i=0}^{99} Xi^2 \cdot Yi \quad (6)$$

The solutions for the polynomial coefficients a, b and c are obtained in the form of a determinant as an equation (7) below.

$$\begin{pmatrix} a \\ b \\ c \end{pmatrix} = \begin{pmatrix} 100 & \sum_{i=0}^{99} Xi & \sum_{i=0}^{99} Xi^2 \\ \sum_{i=0}^{99} Xi & \sum_{i=0}^{99} Xi^2 & \sum_{i=0}^{99} Xi^3 \\ \sum_{i=0}^{99} Xi^2 & \sum_{i=0}^{99} Xi^3 & \sum_{i=0}^{99} Xi^4 \end{pmatrix} \cdot \begin{pmatrix} \sum_{i=0}^{99} Yi \\ \sum_{i=0}^{99} Xi \cdot Yi \\ \sum_{i=0}^{99} Xi^2 \cdot Yi \end{pmatrix} \quad (7)$$

The solutions for the polynomial coefficients a, b and c obtained by the equation (7) minimize the differences between the measured data (Xi, Yi) and an approximate curve obtained by the equation (1) as mentioned above. Accordingly, the characteristic relationship between the tracking phase and the reproduction envelope level so far discretely obtained is approximated as a continuous function by the above calculative operation.

That is, the non-linear regression calculator 118 executes non-linear regression calculation for the data stored in the semiconductor memory 116 and outputs the polynomial coefficients a, b and c of the equation (1).

The regression curve obtained here is a quadratic polynomial function, which has only one inflection point, namely, a maximum point. This maximum point is about the same in its position as the peak point of the theoretical curve of the tracking phase and the reproduction envelope level shown in FIG. 4. The value Xp of the tracking phase X which gives the maximum point is expressed as an equation (8) below, supposing the solutions for the polynomial coefficients a, b and c obtained by the equation (7) be α, β and γ, respectively.

$$Xp = -\frac{\beta}{2\gamma} \quad (8)$$

In other words, in FIG. 1, a tracking point calculator 119 performs the calculation of the equation (8) and outputs the value Xp as an optimum value of the tracking phase.

At the end of such a series of operations as above, the switch 113 selects the output of the tracking point calculator 119. This allows the phase of the reproduced control signal CTL with respect to the reference signal REF (tracking phase) to be controlled so as to be become identical to the value Xp outputted from the tracking point calculator 119. This target value Xp of the tracking phase X is equivalent to the abscissa peak-point value on the characteristic curve in FIG. 4 and, as already mentioned, this just corresponds to the timing at which the rotary head 107 is positioned just on the helical track.

Figure 5:
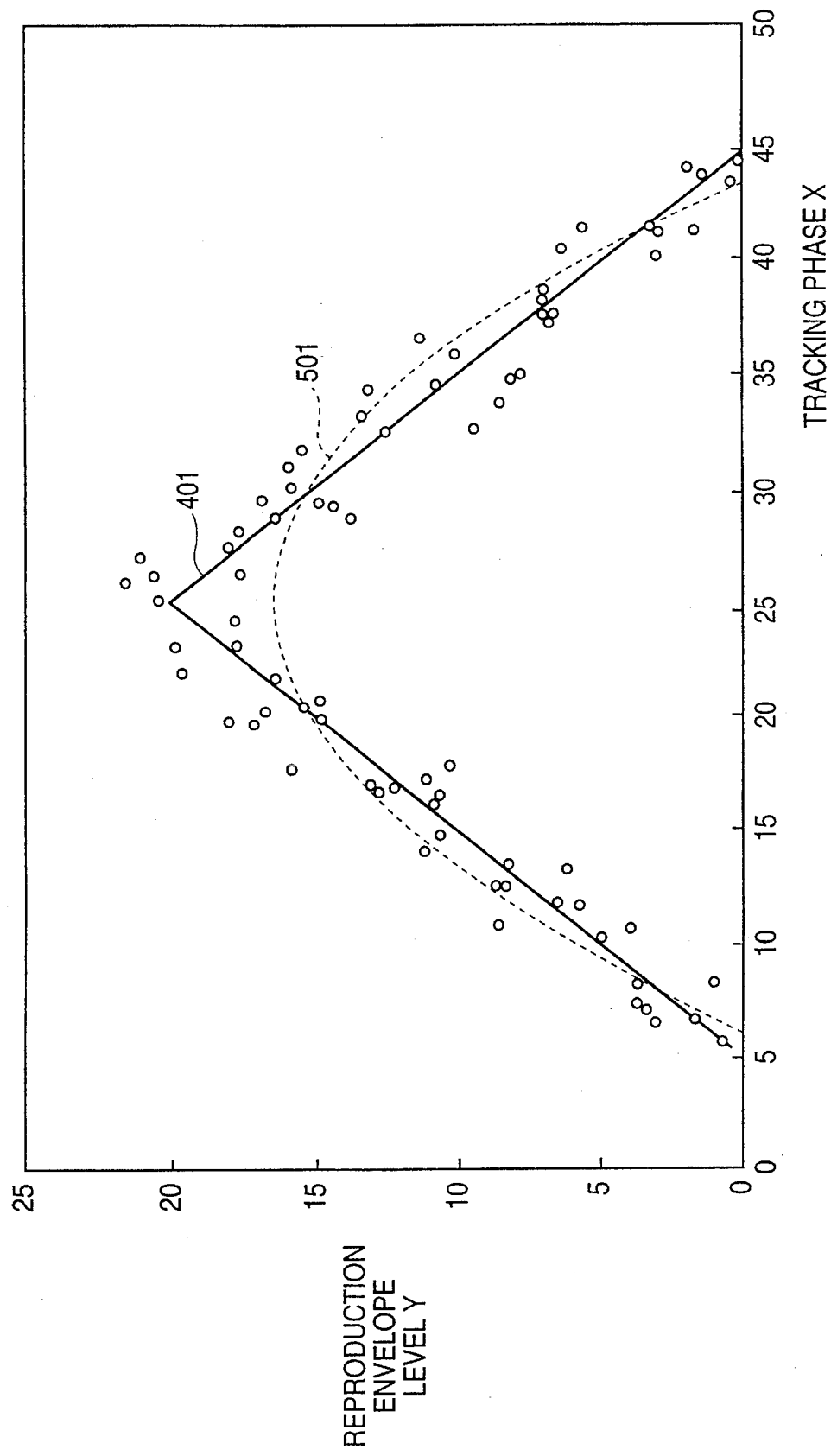
FIG. 5 shows a regression curve plotted using a quadratic polynomial function in correspondence with the 100-item (Xi and Yi) data-based characteristic curve shown in FIG. 4.

FIG. 5 shows a regression curve plotted using the quadratic polynomial function with respect to the 100 (Xi, Yi) data-based characteristic curve shown in FIG. 4. In FIG. 5, the curve 401 is a theoretical value curve based on the principle of magnetic recording and the same as that shown in FIG. 4. Circular marks, as in FIG. 4, indicate the points at which the previously obtained discrete data (Xi, Yi) are plotted. The curve 501 is a regression curve in accordance with the quadratic polynomial function obtained by the regression curve operator 118. And the values of the polynomial coefficients a, b and c obtained in this case are:

$$a = -12.406 \quad (9)$$

$$b = 2.3137 \quad (10)$$

$$c = -0.046568 \quad (11)$$

Further, an optimum value Xp of the tracking phase calculated by the tracking point calculator 119 using the equation (8) is:

$$X_p = 24.842 \quad (12)$$

A truly optimum value of the tracking phase is obtained at the abscissa peak-point value of "25.0" on the theoretical value curve 401. It is found that an optimum tracking phase is obtained with a high-degree of precision.

In the above embodiment, the head width Hw of the rotary head 107 is equal to the track width Tw of the helical track. Next, a case in which the head width Hw is set wider than the track width Tw will be described. In this case as well, tracking can be regulated using the tracking control apparatus of this invention without changing any of its structure.

Figure 11:
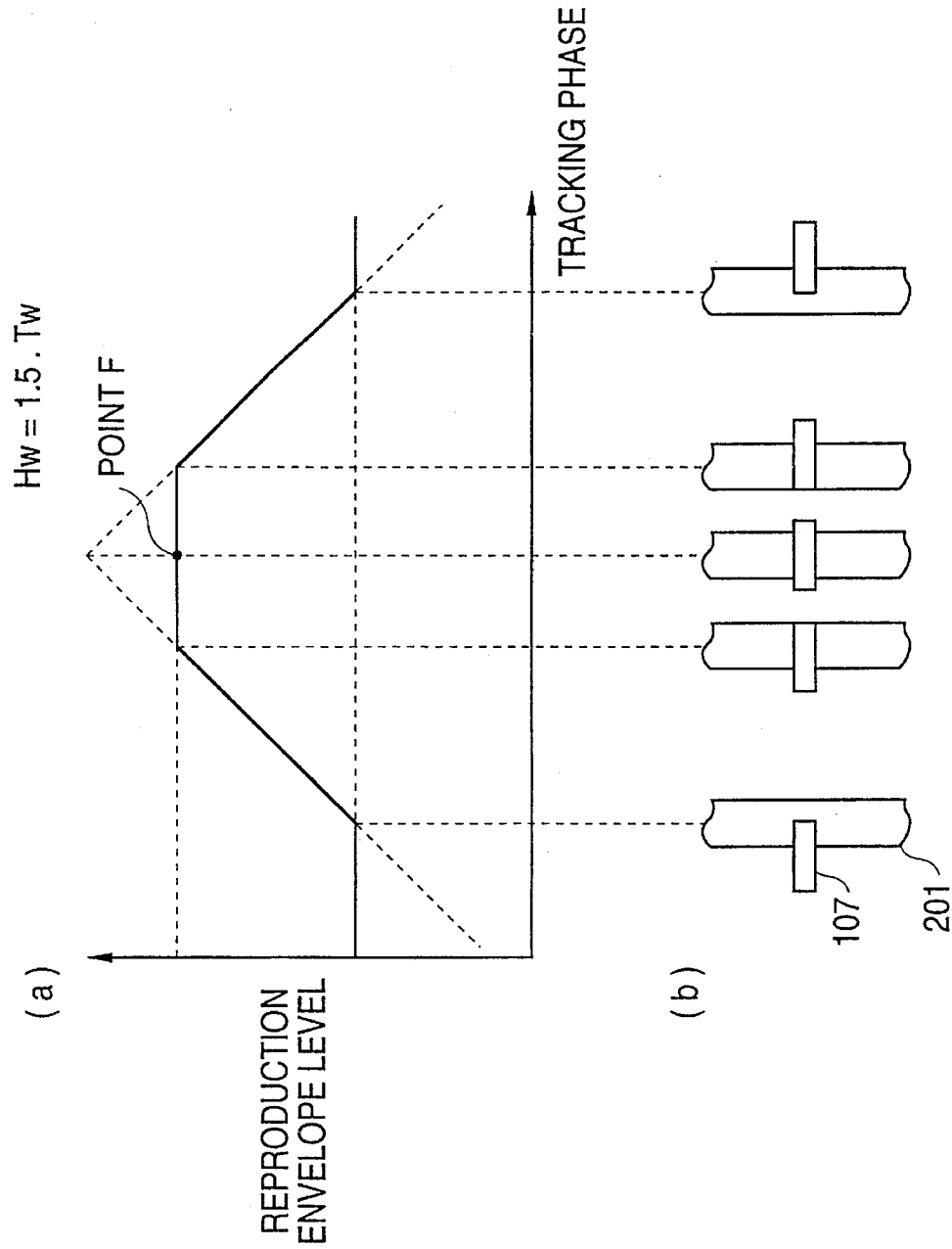
FIG. 11(a) or (b) shows a characteristic relationship between a tracking phase and a reproduced signal envelope level at a rotary head when a track width of a helical track is larger than a head width of the rotary head by which the reproduced signal is obtained and a relative-positional relationship between the helical track and the rotary head at each point illustrated.

In FIG. 11, (a) shows a characteristic relationship between the tracking phase and the reproduction envelope level when the head width of the rotary head used for reproduction is wider than the track width of the helical track, and (b) shows a corresponding relative-positional relationship between the rotary head 107 and the helical track 201. The optimum point of the tracking phase for the helical track 201 as shown in FIG. 11 is reached when the center of the helical track comes to the same position as the center of the rotary head, namely, to the point F which is the center point of the trapezoidal characteristic curve.

In other words, when the track width of the helical track is different from the head width of the rotary head used for reproduction, the characteristic of the reproduction envelope level with respect to the tracking phase has no exact peak point but takes the shape of an upwards-convex trapezoid.

Figure 6:
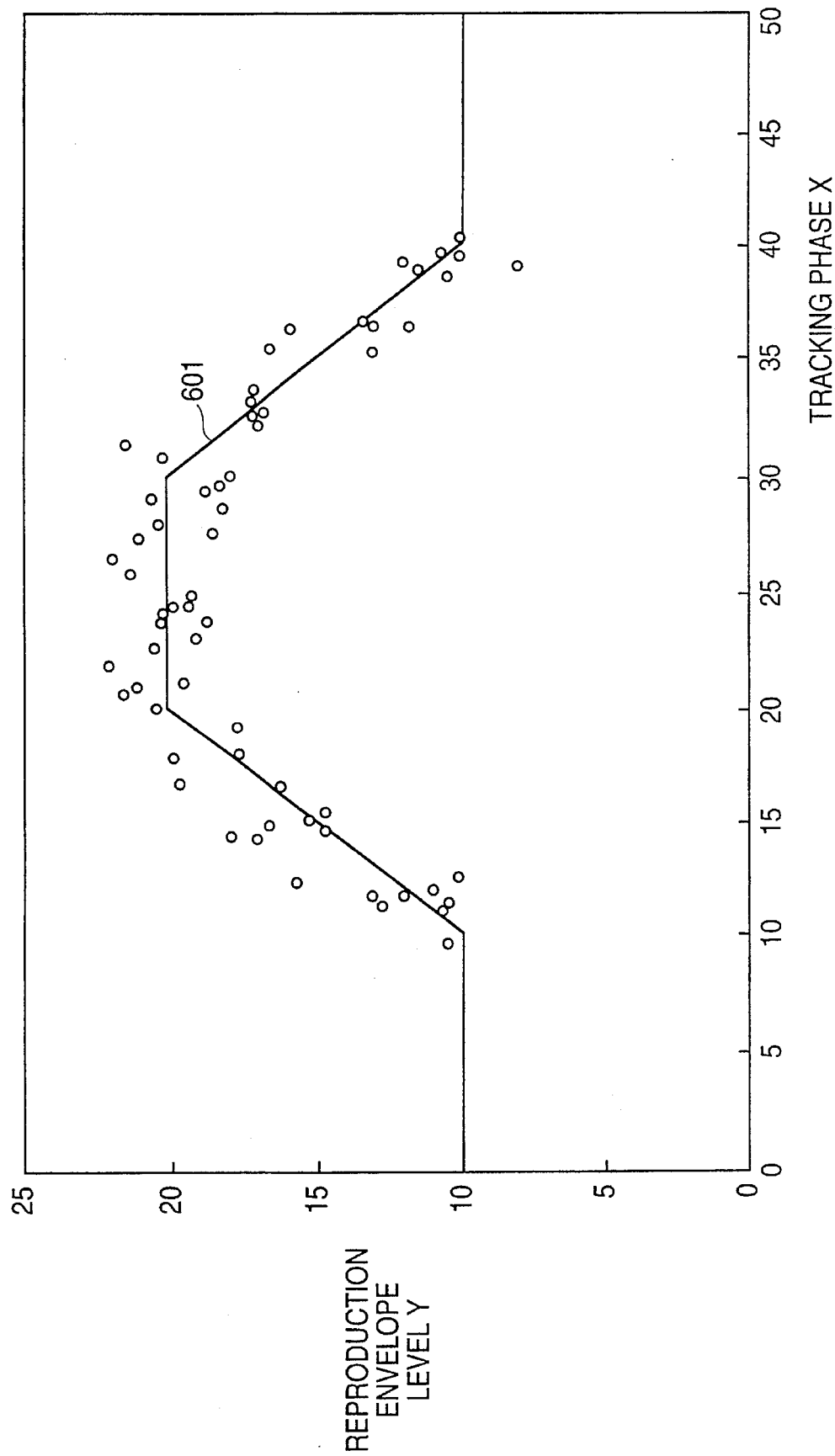
FIG. 6 shows a characteristic relationship between a tracking phase X and a reproduction envelope level Y corresponding to the tracking phase X when a head width Hw of a rotary head 107 is larger than a track width Tw of a helical track.

FIG. 6 shows a characteristic relationship between the tracking phase X and the reproduction envelope level Y corresponding to the tracking phase X when the head width Hw of the rotary head 107 is wider than the track width Tw of the helical track. In FIG. 6, the curve 601 is a theoretical value curve based on the principle of magnetic recording, and circular marks, in this case, indicate the points at which the discrete data (Xi, Yi) obtained by a similar operation in accordance with this invention are plotted. The obtained discrete data (Xi, Yi) are, in this way, dispersively distributed due to measurement noise and/or the fluctuations in the state of contact between the head and the tape while basically following the theoretical value curve.

Figure 7:
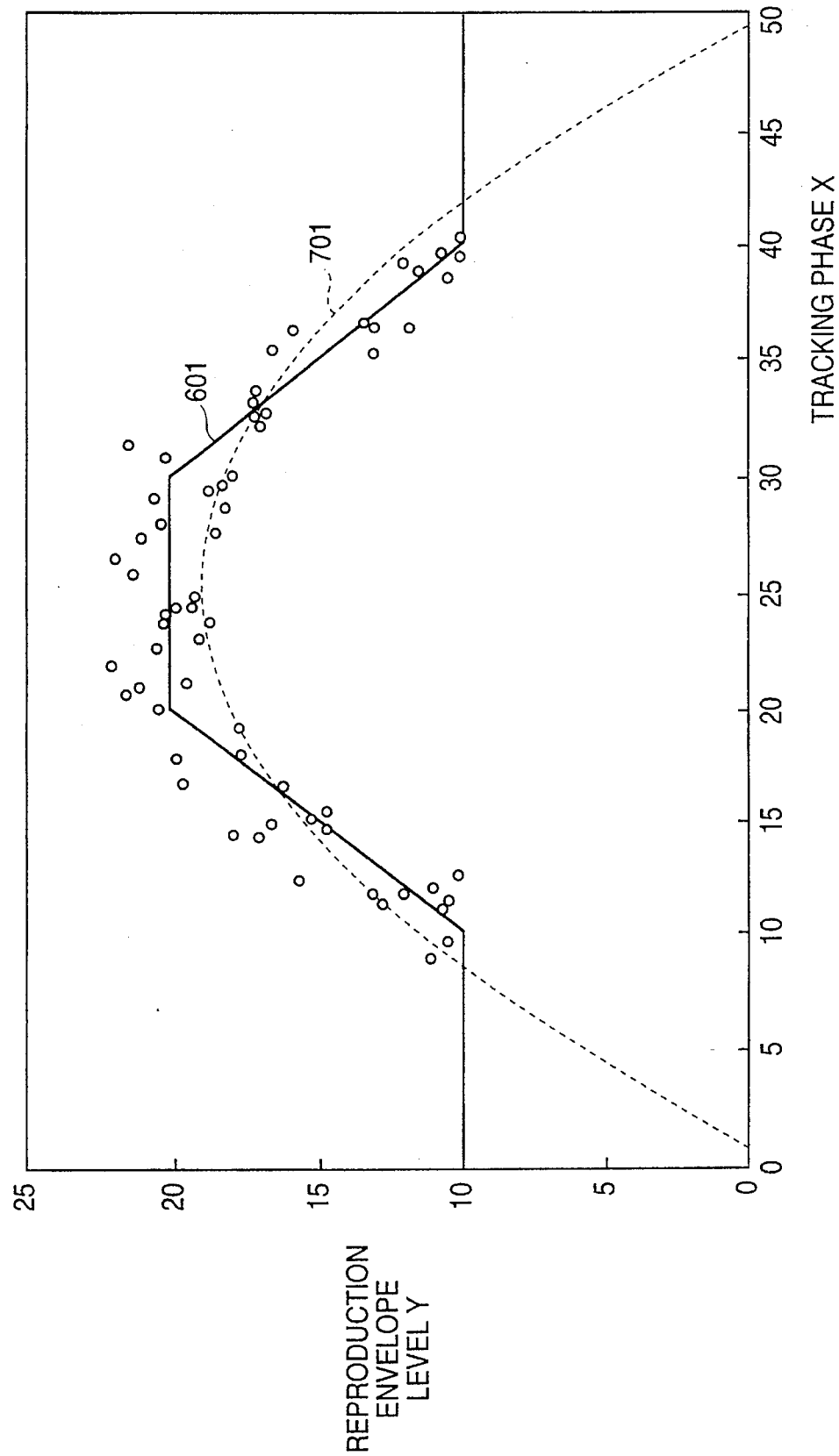
FIG. 7 shows a characteristic curve plotted using a quadratic polynomial function in correspondence with the obtained discrete (Xi and Yi) data-based characteristic curve shown in FIG. 6.

FIG. 7 shows a regression curve plotted using the quadratic polynomial function with respect to the obtained discrete (Xi, Yi) data-based characteristic curve shown in FIG. 6. In FIG. 7, the curve 601 is a theoretical value curve based on the principle of magnetic recording and the same as that shown in FIG. 6. Circular marks, as in FIG. 6, indicate the points at which the obtained discrete data (Xi, Yi) are plotted. The curve 701 is a regression curve in accordance with the quadratic polynomial function obtained by the regression curve operator 118. At this time, the values of by polynomial coefficients a, b and c obtained are:

$$a = -1.2643 \quad (13)$$

$$b = 1.6030 \quad (14)$$

$$c = -0.031893 \quad (15)$$

Further, an optimum tracking phase value Xp calculated by the tracking point calculator 119 using the equation (8) is:

$$X_p = 25.130 \quad (16)$$

A truly optimum tracking phase value is obtained at the abscissa center-point value of "25.0" on the trapezoidal theoretical value curve 601. It is found that an optimum tracking phase is obtained with a high degree of precision.

Next, a case where the head width Hw is set narrower than the track width Tw will be described. In this case as well, tracking can be regulated using the tracking control apparatus of this invention without changing any of its structure.

Figure 12:
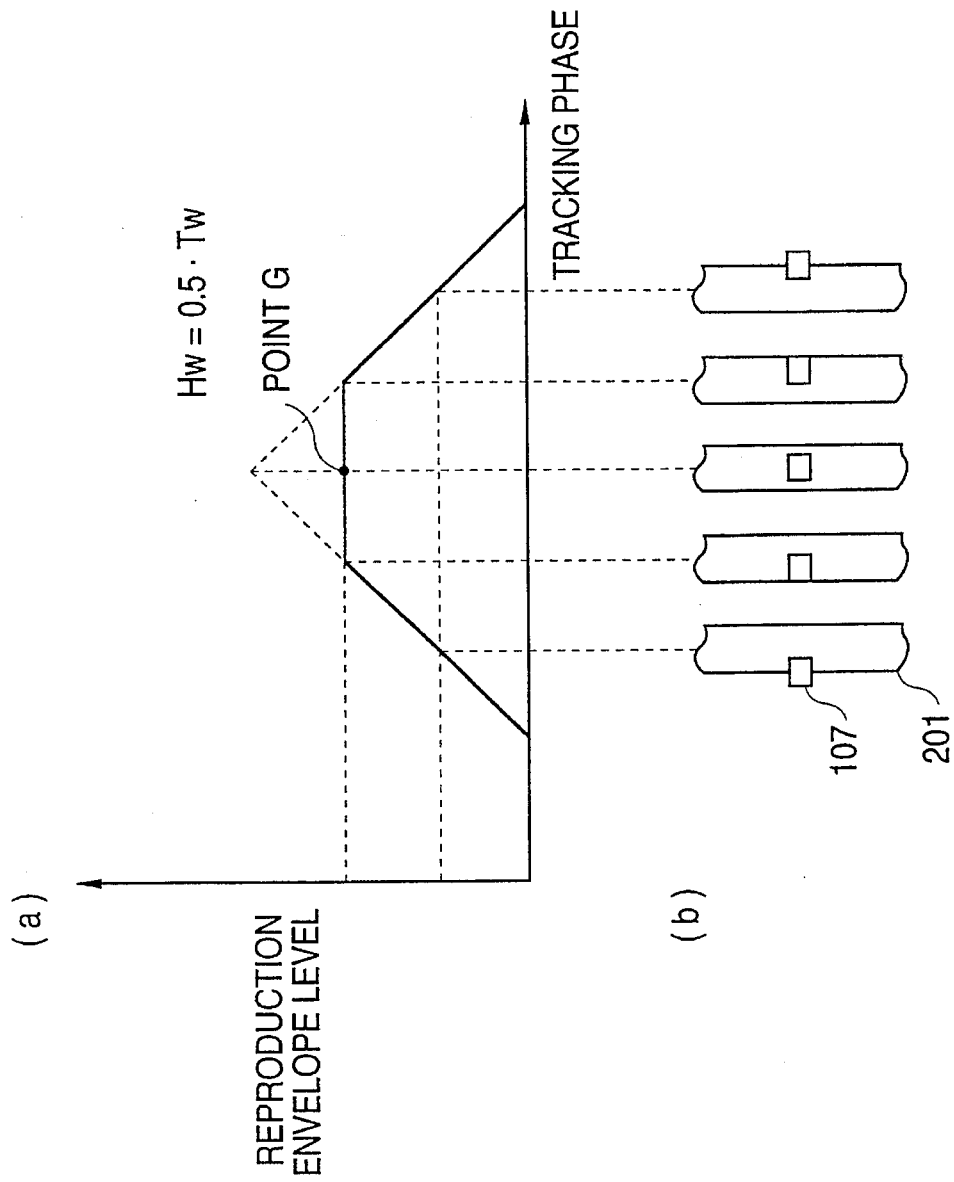
FIG. 12(a) or (b) shows a characteristic relationship between a tracking phase and a reproduced signal envelope level at a rotary head when a track width of a helical track is smaller than a head width of the rotary head by which the reproduced signal is obtained and a relative-positional relationship between the helical track and the rotary head at each point illustrated.

In FIG. 12, (a) shows a characteristic relationship between the tracking phase and the reproduction envelope level when the head width of the rotary head used for reproduction is narrower than the track width of the helical track, and (b) shows a corresponding relative-positional relationship between the rotary head 107 and the helical track 201. The optimum point of the tracking phase for the helical track 201 as shown in FIG. 11 is reached when the center of the helical track comes to the same position as the center of the rotary head, namely, to the point G which is the center point of the trapezoidal characteristic curve.

In other words, when the head width of the rotary head used for reproduction is different from the track width of the helical track, the characteristic of the reproduction envelope level with respect to the tracking phase has no exact peak point but takes the shape of an upwards-convex trapezoid.

Figure 8:
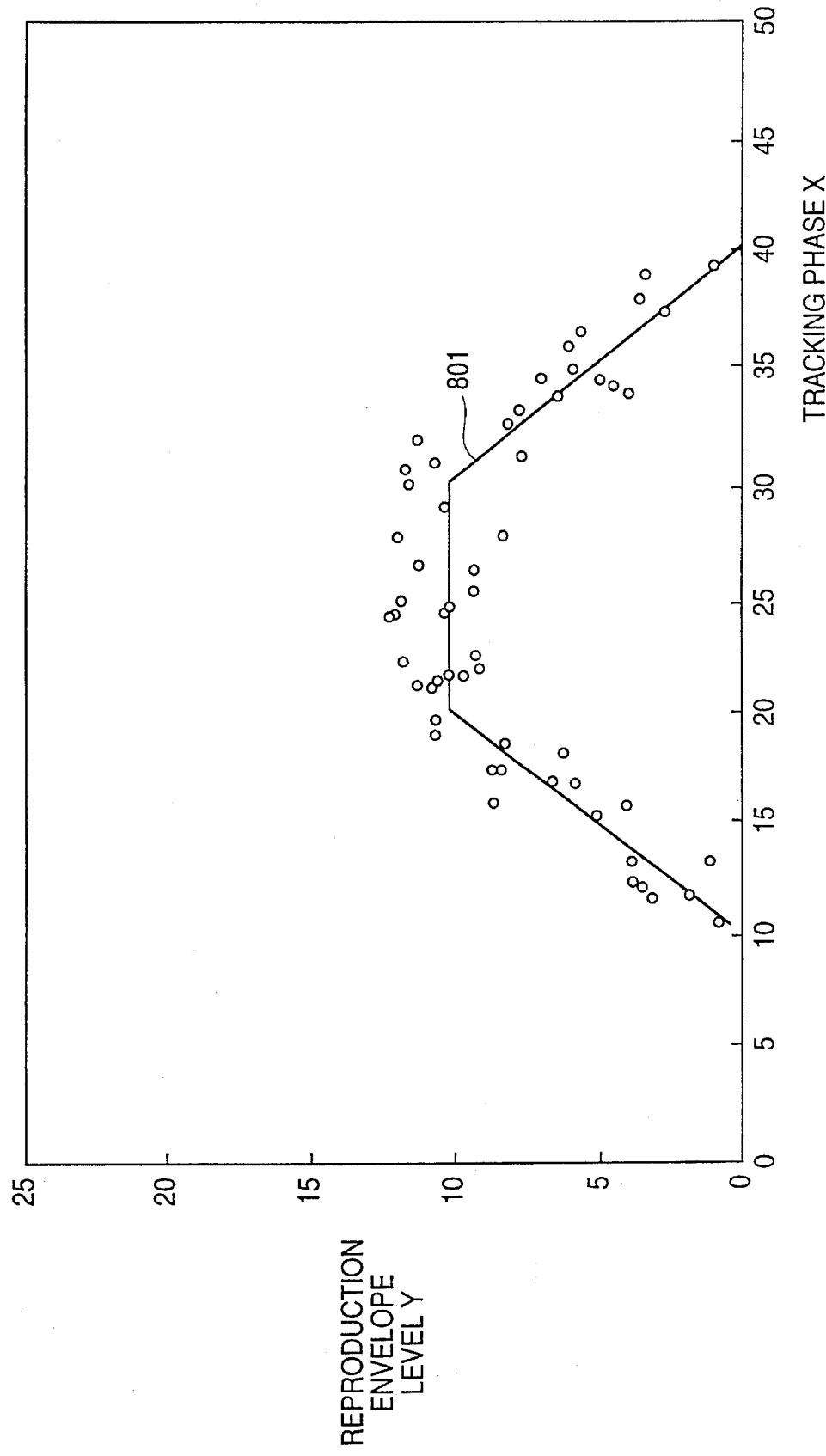
FIG. 8 shows a characteristic relationship between a tracking phase X and a reproduction envelope level Y corresponding to the tracking phase X when a head width Hw of a rotary head 107 is smaller than a track width Tw of a helical track.

FIG. 8 shows a characteristic relationship between the tracking phase X and the reproduction envelope level Y corresponding to the tracking phase X when the head width Hw of the rotary head 107 is narrower than the track width Tw of the helical track. In FIG. 8, the curve 801 is a theoretical value curve based on the principle of magnetic recording, and circular marks, in this case, indicate the points at which the discrete data (Xi, Yi) obtained by a similar operation in accordance with this invention are plotted. As in FIG. 4, the obtained discrete data (Xi, Yi) are, in this way, dispersively distributed due to measurement noise and/or the fluctuations in the state of contact between the head and the tape, though they basically follow the theoretical value curve.

Figure 9:
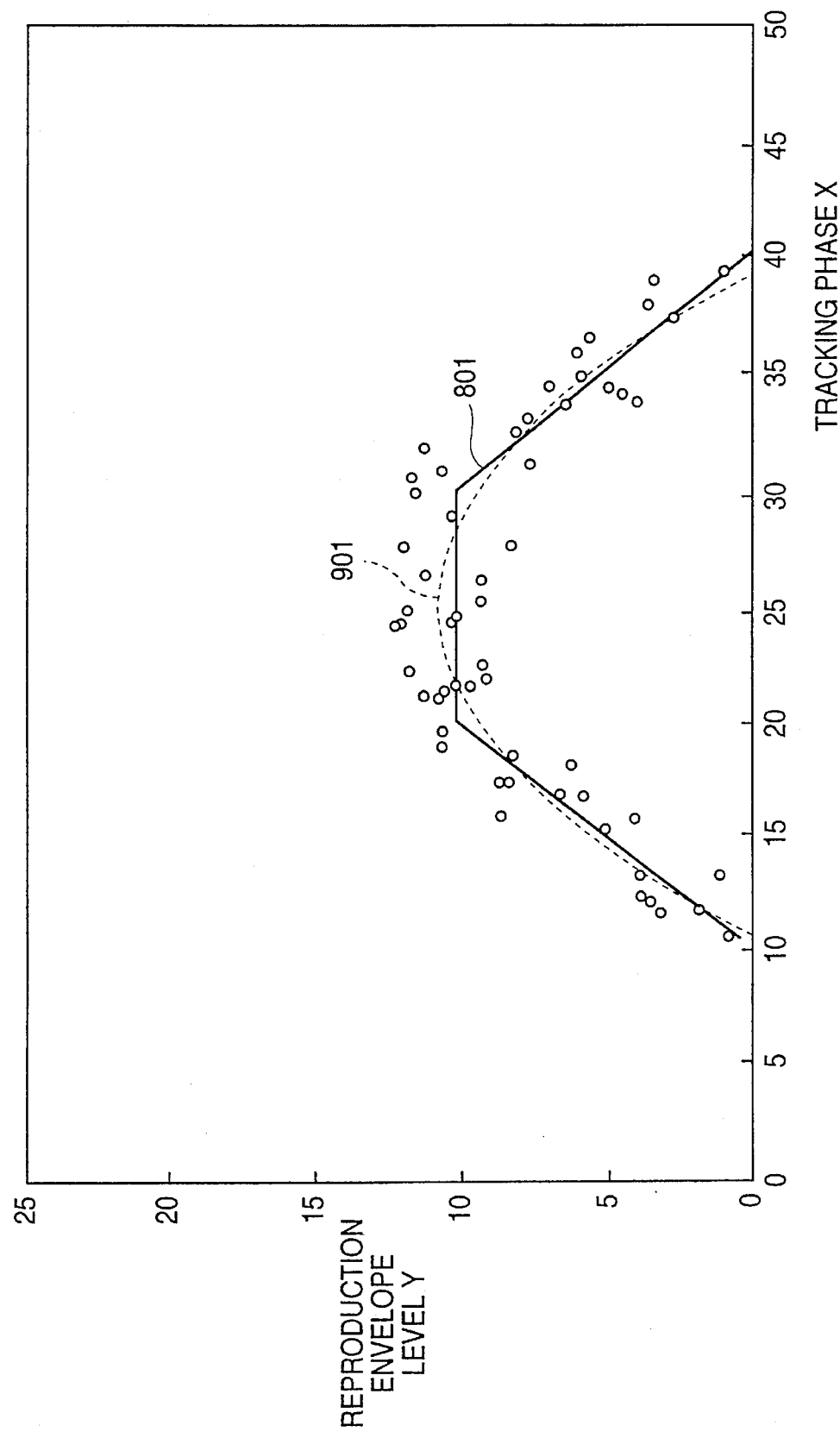
FIG. 9 shows a characteristic curve plotted using a quadratic polynomial function in correspondence with the obtained discrete (Xi and Yi) data-based characteristic curve shown in FIG. 8.

FIG. 9 shows a regression curve plotted using the quadratic polynomial function with respect to the obtained discrete (Xi, Yi) data-based characteristic curve shown in FIG. 8. In FIG. 9, the curve 801 is a theoretical value curve based on the principle of magnetic recording and the same as that shown in FIG. 8. Circular marks, as in FIG. 8, indicate the points at which the discrete data (Xi, Yi) obtained are plotted. The curve 901 is a regression curve plotted in accordance with the quadratic polynomial function obtained by the regression curve calculator 118. At that time, the values of the polynomial coefficients a, b and c obtained are:

$$a = -21.199 \quad (17)$$

$$b = 2.5697 \quad (18)$$

$$c = -0.051719 \quad (19)$$

Further, an optimum tracking phase value Xp calculated by the tracking point calculator 119 using the equation (8) is:

$$X_p = 24.843 \quad (20)$$

A truly optimum tracking phase value is obtained at the abscissa center-point value of "25.0" on the trapezoidal theoretical value curve 801. It is found that an optimum tracking phase is obtained with a high degree of precision.

Thus, in the preferred embodiments of this invention, a curve showing the characteristic relationship between the tracking phase and the reproduction envelope level is subject to non-linear regression using a quadratic polynomial function as a means to obtain a regression curve to determine an optimum tracking phase, thereby enabling an optimum tracking phase to be determined even if the head width Hw and the track width Tw are not the same.

As a matter of fact, VCRs generally have standardized positions of the helical track and the control signal to be recorded and are manufactured in accordance with such standards. The standards should, however, be met even in a case where the helical track already recorded is rewritten into another by an insert editing or a new helical track is added to follow the one already recorded by an assemble editing. This is the reason why, in the above embodiments, the sampling timing of the envelope level of the reproduced video signal obtained at the rotary head 107 is set at the timing at which the rotary head 107 scans the position on the helical track determined at a distance of XT from the control signal recording position as mentioned before.

Figure 13:
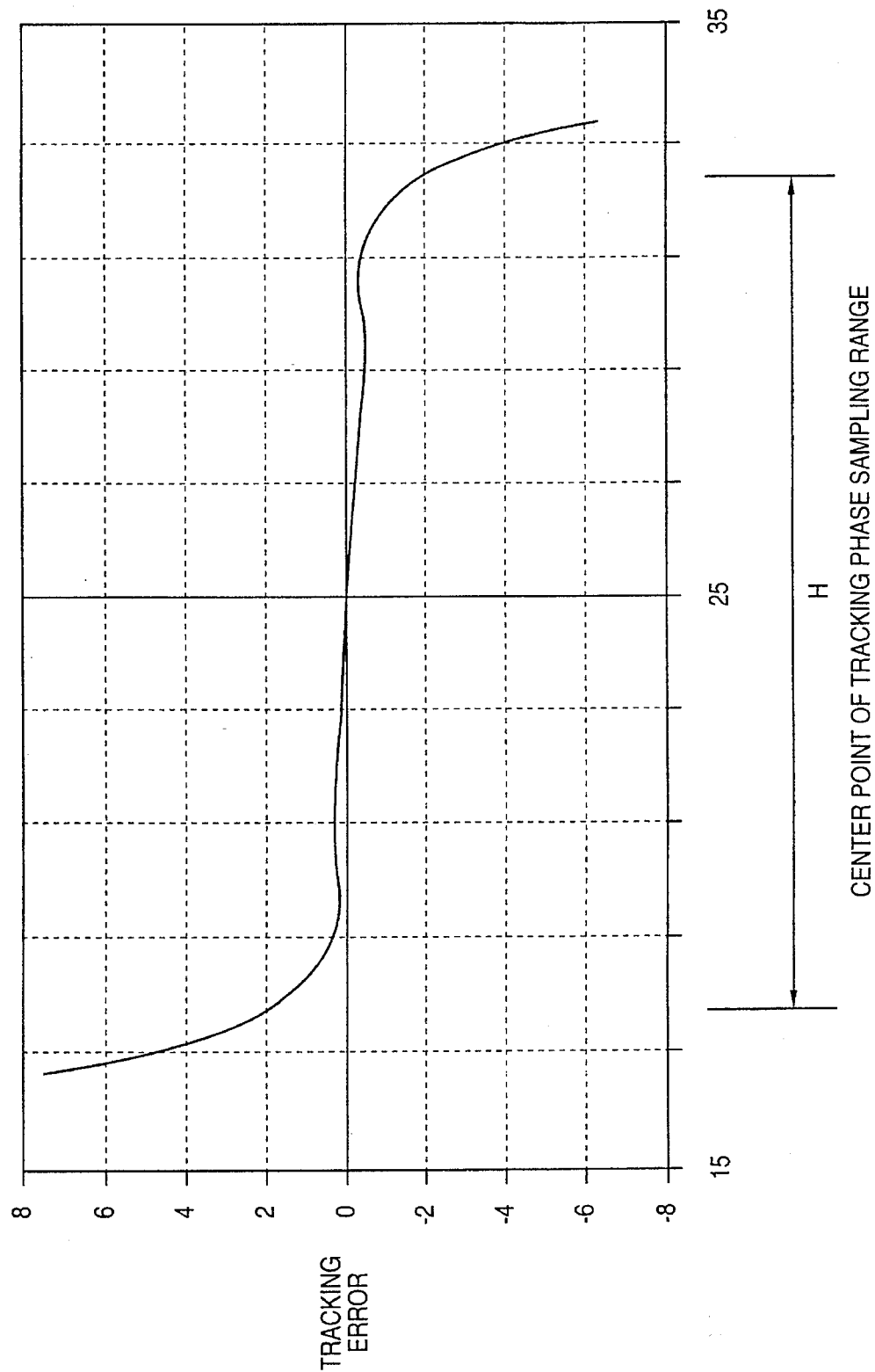
FIG. 13 shows a plotted curve of tracking errors with respect to a center of a range in which a tracking phase X is sampled when the range is changed on condition that its width be constant in a case where a head width Hw of a rotary head 107 is set at 1.5 times as large as a track width Tw of a helical track.

Although the above embodiments enable sufficiently accurate automatic tracking regulation to be realized, it is possible to further increase the accuracy by effectively utilizing the operational characteristics of the tracking control apparatus of this invention as described below. FIG. 13 shows a plotted curve of a relationship between a center point of a range in which the tracking phase X is sampled along the theoretical curve 601 when such a range is changed on condition that the range width (here the range width is Tw in terms of the tracking error) be constant and a difference between the value Xp obtained by the tracking point calculator 119 and the optimum tracking phase (the point F in FIG. 10), namely, the tracking error, in a case where the head width Hw of the rotary head 107 is set 1.5 times the track width Tw of the helical track (already in FIG. 10, a theoretical relationship between the tracking phase X and the reproduction envelope level Y has been shown). When the center point of the tracking phase sampling range comes to the same position as the truly optimum tracking phase, the tracking error becomes "0" and, in the range H illustrated, the relationship between the deviation amount of the tracking phase sampling range center point from the truly optimum tracking phase and the tracking error becomes a monotonic curve with an inclination of less than 1. In this connection, the deviation of the tracking phase sampling range center point from the truly optimum tracking phase may be regarded as the tracking error possessed by the magnetic recording and reproduction equipment at the time of signal recording, namely, the tracking error which should be corrected by the tracking control apparatus of this invention. Hence, by again sampling and storing in the semiconductor memory 116 a tracking phase range around the value Xp obtained by the tracking point calculator 119 for the calculation of non-linear regression by the non-linear regression calculator 118 to feed back the value Xp so as to be renewed by the tracking point calculator 119, the value Xp outputted from the tracking point calculator 119 may be converged into the value of a truly optimum tracking phase. Of course, a wide range of data may be obtained from a characteristic curve of the tracking phase X and the reproduction envelope level Y and stored in the semiconductor memory 116 beforehand so that a required range of characteristic curve data can be timely read out from the memory in each round of the feedback operation.

Alternatively, by monitoring a change of the value Xp outputted from the tracking point calculator 119 each round of the feedback operation to confirm the convergence of the feedback operation, the feedback operation may be suspended when the amount of the change becomes equal to or less than a predetermined level.

Here, a case in which the head width Hw of the rotary head 107 is set 1.5 times the track width Tw of the helical track was explained but, of course, the relationship between the head width Hw of the rotary head 107 and the helical track Tw is not limited to this setting.

The above are the embodiments where a tracking control apparatus of this invention is used in such magnetic reproduction equipment that, like the VHS-system VCRs, has a predetermined distance between a specified position of the helical track recorded on a magnetic tape and a position at which a control signal is recorded on the magnetic tape in a lengthwise direction thereof synchronously with a reference signal, controls the tracking phase which is the phase of the reproduced control signal with respect to the reference signal at the time of reproduction, and adjusts the relative position of the helical track to the rotary head to regulate tracking. A tracking control apparatus of this invention is, however, not limited to the use in such magnetic reproduction equipment like the VHS-system VCRs. The present invention can provide an optimum tracking control apparatus usable also in such magnetic reproduction equipment as 8-mm VCRs and digital audio tape recorders (hereinafter referred to as DATs) where tracking is controlled by ATF signals. In this case, since two reproduced signal components are extracted from helical tracks adjacent to a target helical track to be scanned by the rotary head at both the right and left sides thereof, and the magnetic tape running is driven so that the level difference between the two reproduced signal components is kept at a specified value to control tracking, the use of the signal level of the differential signal obtained from the two reproduced signal components from the right and left neighboring helical tracks instead of the tracking phase in the above-mentioned embodiments enables an optimum tracking control to be easily performed. In other words, by obtaining a curve showing a characteristic relationship between the signal level of the differential signal between the reproduced signal components from the right and left neighboring helical tracks and the envelope level of the reproduced signal from the helical track to be scanned obtained at the rotary head, a regression curve with respect to such a characteristic curve may be determined to control the running of the magnetic tape so that the signal level of the differential signal becomes a value corresponding to the maximum value point of the regression curve.

Needless to say, however, the embodiments so far used for explanation in the above are nothing more than embodiments of this invention and this invention can be modified in a variety of manners without changing its purpose.

What is claimed is:

1. In a magnetic reproduction system for reproducing with a rotary head an information signal recorded on a magnetic tape which is controlled to run so as to have a predetermined relative phase with respect to a rotation phase of the rotary head, a tracking control apparatus comprising:

an envelope level detector, said envelope level detector detecting an envelope level of a reproduced information signal obtained by the rotary head;

a relative phase changer, said relative phase changer changing a relative phase of the running magnetic tape with respect to the rotation phase of the rotary cylinder;

a memory, said memory storing therein values of said relative phase changed by said relative phase changer and values of said envelope level detected by said envelope level detector respectively at the values of said relative phase whereby the values stored therein represent a characteristic curve showing a characteristic relationship between said envelope level and said relative phase;

a non-linear regression calculator, said non-linear regression calculator calculating a regression curve with respect to said characteristic curve by using the values stored in said memory; and a controller, said controller controlling a running phase of the magnetic tape so that said relative phase becomes a value corresponding to a maximum value point of said regression curve.

2. A tracking control apparatus according to claim 1, wherein said regression calculator uses a quadratic polynomial function as said regression curve.

3. In a magnetic reproduction system for reproducing an information signal with a rotary head from a magnetic tape having formed thereon a helical track on which the information signal has been recorded and a control track which extends in a lengthwise direction of the magnetic tape and on which a control signal synchronized with a reference signal has been recorded at a position at a predetermined distance from a specified position on the helical track, a tracking control apparatus comprising:

a control head for reproducing the control signal from the control track to obtain a reproduced control signal;

an envelope level detector, said envelope level detector detecting an envelope level of a reproduced information signal obtained by the rotary head;

a tracking phase changer, said tracking phase changer changing a tracking phase which is a phase of the reproduced control signal with respect to the reference signal;

a memory, said memory storing therein values of said tracking phase changed by said tracking phase changer and values of said envelope level detected by said envelope level detector respectively at the values of said tracking phase whereby the values stored therein represent a characteristic curve showing a characteristic relationship between said envelope level and said tracking phase;

a non-linear regression calculator, said non-linear regression calculator calculating a regression curve with respect to said characteristic curve by using the values stored in said memory; and a tracking controller, said tracking controller controlling a relative position of the helical track to the rotary head so that the tracking phase becomes a value corresponding to a maximum value point of said regression curve.

4. A tracking control apparatus according to claim 3, wherein said regression calculator uses a quadratic polynomial function as said regression curve.

5. A tracking control device according to claim 3, wherein said envelope detector, tracking phase changer, and memory obtain and store values corresponding to said characteristic curve from an envelope level of the reproduced information signal when the rotary head comes to said specified position on the helical track.

6. In a magnetic reproduction system for reproducing an information signal with a rotary head from a magnetic tape having formed thereon a helical track on which the information signal has been recorded and a control track which extends in a lengthwise direction of the magnetic tape and on which a control signal synchronized with a predetermined distance from a specified position on the helical track, a tracking control apparatus comprising:

a control head for reproducing the control signal from the control track to obtain a reproduced control signal;

an envelope level detector, said envelope level detector detecting an envelope level of a reproduced information signal obtained by the rotary head;

a tracking phase changer, said tracking phase changer changing a tracking phase which is a phase of the reproduced control signal with respect to the reference signal in a predetermined changing range with an externally provided command value as an approximate center thereof;

a memory, said memory storing therein values of said tracking phase changed by said tracking phase changer and values of said envelope level detected by said envelope level detector respectively at the values of said tracking phase whereby the values stored therein represent a characteristic curve showing a characteristic relationship between said envelope level and said tracking phase;

a non-linear regression calculator, said non-linear regression calculator calculating a regression curve with respect to said characteristic curve by using the values stored in said memory;

a tracking point calculator, said tracking point calculator calculating a tracking phase corresponding to a maximum value point of said regression curve obtained by the non-linear regression calculator and for feeding back the calculated tracking phase to the tracking phase changer as said externally provided command value; and a controller, said controller controlling the magnetic tape to run so that the tracking phase becomes a value corresponding to a value finally obtained by the tracking point calculator.

7. In a magnetic reproduction system for reproducing an information signal with a rotary head from a magnetic tape having formed thereon a helical track on which the information signal has been recorded and a control track which extends in a lengthwise direction of the magnetic tape and on which a control signal synchronized with a reference signal has been recorded at a position at a predetermined distance from a specified position on the helical track, a tracking control apparatus comprising:

a control head for reproducing the control signal from the control track to obtain a reproduced control signal;

an envelope level detector, said envelope level detector detecting an envelope level of a reproduced information signal obtained by the rotary head;

a tracking phase changer, said tracking phase changer changing a tracking phase which is a phase of the reproduced control signal with respect to the reference signal in a predetermined changing range with an externally provided command value as an approximate center thereof;

a memory, said memory storing therein values of said tracking phase changed by said tracking phase changer and values of said envelope level detected by said envelope level detector respectively at the values of said tracking phase whereby the values stored therein represent a characteristic curve showing a characteristic relationship between said envelope level and said tracking phase;

a non-linear regression calculator, said non-linear regression calculator calculating a regression curve with respect to said characteristic curve by using the values stored in said memory;

a tracking point calculator, said tracking point calculator calculating a tracking phase corresponding to a maximum value point of said regression curve obtained by the non-linear regression calculator and for feeding back the calculated tracking phase to the tracking phase changer as said externally provided command value; and a controller, said controller controlling the tracking point calculator to stop feeding back the calculated tracking phase when the calculated tracking phase is within a predetermined range, and for controlling said magnetic tape to run sot hat the tracking phase becomes a value corresponding to a value finally obtained by the tracking point calculator.

8. A tracking control apparatus comprising:

a rotary head for reproducing an information signal from a helical track which has been formed on a magnetic tape and has recorded thereon the information signal to obtain a reproduced information signal;

a tracking error signal generator, said tracking error signal generator generating a tracking error signal indicating a difference between a position of the helical track and a position of the rotary head;

a curve generator, said curve generator obtaining a characteristic curve showing a characteristic relationship between a signal level of the tracking error signal and an envelope level of the reproduced information signal;

an envelope level detector, said envelope level detector detecting an envelope level of a reproduced information signal obtained by the rotary head;

a tracking error signal changer said tracking error signal changer changing a signal level of the tracking error signal;

a memory, said memory storing therein values of said tracking error signal changed by said tracking error signal changer and values of said envelope level detected by said envelope level detector respectively at the values of the signal level of said tracking error signal whereby the values stored therein represent a characteristic curve showing a characteristic relationship between said envelope level and said tracking error signal;

a non-linear regression calculator, said non-linear regression calculator calculating a regression curve with respect to said characteristic curve by using the values stored in said memory; and a controller, said controller controlling the magnetic tape to run so that the signal level of the tracking error signal becomes a value corresponding to a maximum value point of said regression curve.

9. A tracking control apparatus according to claim 8, wherein said non-linear regression calculator uses a quadratic polynomial function as said regression curve.

10. In a magnetic reproduction system for reproducing an information signal with a rotary head from a magnetic tape having formed thereon a helical track on which the information signal has been recorded and a control track which extends in a lengthwise direction of the magnetic tape and on which a control signal synchronized with a reference signal has been recorded at a position at a predetermined distance from a specified position on the helical track, a tracking control apparatus comprising:

a control head for reproducing the control signal from the control track to obtain a reproduced control signal;

an envelope level detector, said envelope level detector detecting an envelope level of a reproduced information signal obtained by the rotary head;

a tracking phase changer, said tracking phase changer changing a tracking phase which is a phase of the reproduced control signal with respect to the reference signal in a first predetermined changing range;

a memory, said memory storing therein values of said tracking phase changed by said tracking phase changer in the first predetermined changing range and values of said envelope level detected by said envelope level detector respectively at the values of said tracking phase whereby the values stored therein represent a characteristic curve showing a characteristic relationship between said envelope level and said tracking phase;

a non-linear regression calculator, said non-linear regression calculator calculating a regression curve with respect to said characteristic curve by using the values stored in said memory in a second predetermined changing range with an externally provided command value as an approximate center thereof, said second predetermined changing range being within and smaller than said first predetermined changing range;

a tracking point calculator, said tracking point calculator calculating a tracking phase corresponding to a maximum value point of said regression curve obtained by the non-linear regression calculator and for feeding back the calculated tracking phase to the non-linear regression calculator as said externally provided command value; and a controller, said controller controlling the tracking point calculator to stop feeding back the calculated tracking phase when the calculated tracking phase is within a predetermined range, and for controlling said magnetic tape to run so that the tracking phase becomes a value corresponding to a value finally obtained by the tracking point calculator.

* * * * *